United States Patent [19]
Mattei et al.
[11] Patent Number: 4,627,319
[45] Date of Patent: Dec. 9, 1986

[54] DEVICE FOR SUPPLYING WEBS OF WRAPPING MATERIAL TO A CIGARETTE MAKING MACHINE OF THE TWO ROD TYPE

[75] Inventors: Riccardo Mattei; Armando Neri, both of Bologna, Italy

[73] Assignee: G.D. Societa per Azioni, Bologna, Italy

[21] Appl. No.: 704,589

[22] Filed: Feb. 22, 1985

[30] Foreign Application Priority Data

Feb. 23, 1984 [IT] Italy ................................ 3351 A/84

[51] Int. Cl.$^4$ ............................................ B23Q 15/22
[52] U.S. Cl. ........................................ 83/73; 83/358
[58] Field of Search ................. 83/73, 358; 226/18–23

[56] References Cited

U.S. PATENT DOCUMENTS 2,738,729 3/1956 Brooks ............................. 83/358 X
3,719,114 3/1973 Vischulis ......................... 83/358 X
4,336,812 6/1982 Seragnoli ......................... 131/84 R
4,383,633 5/1983 Seragnoli ......................... 226/194

FOREIGN PATENT DOCUMENTS 958047 9/1982 U.S.S.R. ............................... 83/358

*Primary Examiner*—James M. Meister
*Attorney, Agent, or Firm*—Cushman, Darby & Cushman

[57] ABSTRACT

A device for supplying webs of wrapping material to a cigarette making machine of the two rod type is constituted by a device for cutting a web of wrapping material into a first and a second web of identical width, and by deviation devices associated with each of the webs for the displacement thereof in a direction crosswise to that in which the webs move forward. Connected to the first and second web are detector devices provided for operating, through circuit elements, a motor for each of the three deviation devices in such a way as to cancel, moment by moment, any possible differences in width between the first web and the second web and any deflection thereof with respect to a given sliding position.

7 Claims, 7 Drawing Figures

DEVICE FOR SUPPLYING WEBS OF WRAPPING MATERIAL TO A CIGARETTE MAKING MACHINE OF THE TWO ROD TYPE

BACKGROUND OF THE INVENTION

The invention relates to a device for supplying webs of wrapping material to a cigarette making machine of the two rod type and, in particular, to a device for checking the position and width of the webs of paper utilized on this type of machine.

DESCRIPTION OF THE PRIOR ART

In accordance with what is known from, for example, U.S. Pat. No. 4,336,812 in the name of the same applicant as herein, describing a cigarette making machine of the two rod type, a web of paper is unwound from a reel and subdivided into two webs of identical width by means of a cutter device.

Onto each of the said webs, guided above a horizontal surface, is placed a corresponding rope of tobacco.

Guide means force the two webs, while sliding on the horizontal surface, to wrap progressively around the individual ropes in such a way as to form two continuous rods of tobacco which a cutter device subsequently divides into cigarettes.

A fundamental condition for the correct operation of a cigarette making machine of the above mentioned type is the creation of two rods which, besides being well formed, are also perfectly identical one to the other.

This condition is often not respected because of problems in consequence of the forming and supplying in the utilization area of the two webs of wrapping material.

More precisely, even small deflections of the web upstream of the cutter device cause the generation there from of two webs of a different width, while the result of even small deflections of the two webs from a given initial position is that the webs fail to be centered perfectly beneath the position at which the corresponding ropes of tobacco are discharged.

SUMMARY OF THE INVENTION

The object of the invention is to create a device with which it is possible to overcome the problems that, in a cigarette making machine of the two rod type, are connected with the forming and supplying of the two webs of paper.

The above specified object is achieved with the device according to the invention for supplying webs of wrapping material to a cigarette making machine of the two rod type, comprising a cutter device for separating longitudinally a web of wrapping material, defined as the main web, into a first and a second web; means for guiding the main web to the cutter device; and means for guiding the first and the second web to a utilization area; wherein a deviation device is connected to the said main web for the displacement thereof in a direction crosswise to that in which the web moves forward. Two additional deviation devices are provided, one of which is connected to the first web and the other of which is connected to the second web, for the displacement thereof in a direction crosswise to the directions in which the webs move forward. Also there are means for checking and correcting the width and the position of the first and second webs, constituted by detector devices connected to the first and second webs and by circuit elements that are interlocked to the detector devices for operating a motor in respect of each of the deviation devices.

BRIEF DESCRIPTION OF THE DRAWINGS

The invention will now be described purely as an unlimited example, with reference to the accompanying drawings, in which.

DESCRIPTION OF THE PREFERRED EMBODIMENT

Figure 1:
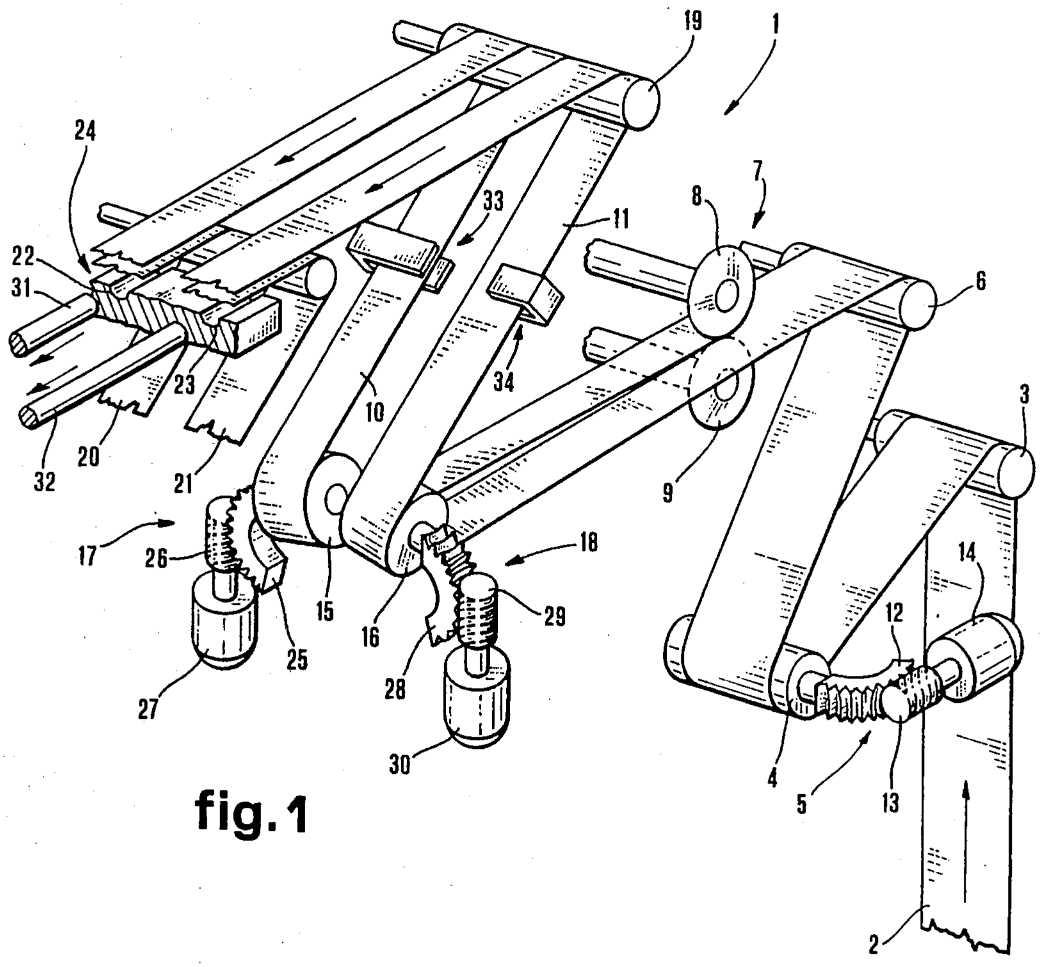
FIG. 1 shows, in a perspective diagrammatic view, a device according to the invention for supplying webs of paper for cigarettes.

With reference to FIG. 1, there is a cigarette making machine 1 of the two rod type.

The machine 1 is supplied with a web 2 of wrapping paper unwound from a non-illustrated reel.

Through guide means comprising a first transmission roller 3, a roller 4 belonging to a deviation device 5, and a second transmission roller 6, the web 2 arrives at a cutter device 7 constituted by two counter-rotating circular blades 8 and 9 that subdivide longitudinally the web 2 into two webs 10 and 11 of identical width.

The deviation device 5 (of the type described as an example in U.S. Pat. No. 4,383,633 in the name of the same applicant as herein) is able to displace the web 2 transversely to the forward movement direction. One extremity of the spindle of the roller 4 is integral with a sector gear 12 that meshes with an endless screw 13 mounted on an output shaft of a dual rotation direction step-by-step motor 14.

Variations in the inclination of the roller 4 and crosswise displacements of the web 2 correspond to rotations, in one direction or the other, of the screw 13.

The two webs 10 and 11, through guide means comprising the rollers 15 and 16, respectively, the former belonging to a deviation device 17 and the latter to a deviation device 18, and a common transmission roller 19, are superposed onto the top run of the belt conveyors 20 and 21, respectively, of the endless type that slide along two parallel guides or slots 22 and 23 of a horizontal surface 24.

The deviation devices 17 and 18 to which the rollers 15 and 16 belong, are similar to the deviation device 5. More precisely, the roller 15 is mounted on a spindle, one extremity of which is integral with a sector gear 25 that meshes with an endless screw 26 fixed to the termination of an output shaft of a dual rotation direction step-by-step motor 27, while the roller 16 is mounted on a spindle integral with a sector gear 28 that meshes with an endless screw 29 fixed to the termination of an output shaft of a dual rotation direction step-by-step motor 30.

In a way in itself known, a non-illustrated rope of cut tobacco is placed on each of the two webs 10 and 11 at the time these slide above the horizontal surface 24.

The two guides 22 and 23 force the two webs 10 and 11 to wrap progressively around the ropes of tobacco in order to form two continuous rods of cigarettes 31 and 32 that are subsequently cut into individual pieces.

Shown overall, there are two detector devices 33 and 34, for example of the photoelectric type, the first of which is mounted in proximity of the web 10 downstream of the roller 15, and the second of which is mounted in proximity of the web 11 downstream of the roller 16. In combination with circuit elements for operating the motors 14, 27 and 30, the detector devices 33 and 34 constitute means for checking and correcting the width and the position of the webs 10 and 11.

Figure 2:
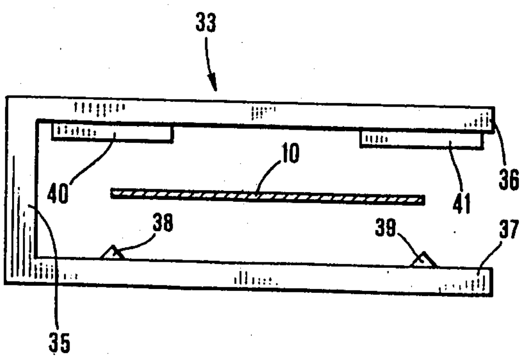
FIG. 2 shows, in a larger scale, a first detail of FIG. 1.

With reference also to FIG. 2, the detector device 33 comprises a U shaped support element 35 between whose arms 36 and 37 slides the web 10.

Mounted on the arm 37 there are photoemission elements constituted, for example, by two devices 38 and 39 that emit infrared rays and face the opposite borders of the web 10.

Fitted to the inside of the second arm 36, at points corresponding to where the devices 38 and 39 are positioned, there are photosensitive means depicted diagrammatically in the two blocks 40 and 41, able to supply, on corresponding output lines, logic type signals indicative of the conditions of illuminance thereof.

The said logic type signals arrive at the input (see also FIG. 4) of corresponding circuit blocks 42 and 43 constituted by digital-analog converters of a known type, and these furnish the corresponding output terminals 44 and 45 with voltage signals proportional to the degree of illuminance of the photosensitive means 40 and 41.

The signals present at the terminals 44 and 45 are, therefore, indicative, moment by moment, of the position of the two opposite borders of the web 10 with respect to the detector device 33.

Each of the photosensitive means 40 and 41 can be constituted, for example, by a plurality of image scanning sensors belonging to CCD array circuits of a known type. In this case, the signals present at the terminals 44 and 45 are proportional to the number of sensors obscured by the righthand edge and the lefthand edge, respectively, of the web 10.

The signals present at the terminals 44 and 45 flow into an adder 46 in order to give rise, on a first input terminal 47, to a voltage signal as a function of the position of both the edges of the web 10 or, in other words, to a signal indicative, moment by moment, of the width of the web 10.

The two blocks 42 and 43 plus the adder 46 constitute jointly a circuit block 48, from which can be taken, as stated previously, both a signal indicative of the width of the web 10 and a signal indicative of the position of this web 10.

The terminal 47 is connected to the input of a logic type comparison circuit block 49, provided with a second input terminal 50, at which arrives a predetermined voltage or threshold signal indicative of the correct crosswise dimension of the web 10.

The block 49 has two outputs connected to a first and to a second output terminal 51 and 52, respectively, of a circuit block 53 of a known type for operating the dual rotation direction step-by-step motor 14 in respect of the deviation device 5 placed upstream of the cutter device 7.

The circuit block 43 converts and emits to an output terminal 45, a second signal indicative of the position of the righthand edge (when looking at FIGS. 1, 2 and 4) of the web 10 with respect to the photosensitive block 41.

The first input terminal 54 is connected to a logic type comparison block 55 provided with a second input terminal 56, at which arrives a predetermined signal indicative of the correct position of the righthand edge of the web 10 and, consequently, of the correct position of the web 10 itself.

The block 55 is provided with two outputs connected to a first and to a second output terminal 57 and 58, respectively, leading to a block 59 of a circuit known type for operating the dual rotation direction step-by-step motor 27 in respect of the deviation device 17 placed downstream of the cutter device 7.

What has been stated up until now in relation to the detector device 33 applies only in part to the detector device 34 (see FIGS. 3 and 5) since this detector device 33 has solely the task of checking the lateral position of the web 11.

It is obvious, in fact, that in order to obtain two webs 10 and 11 of identical width, it is sufficient to check and correct the width of only one of the two.

Figure 3:
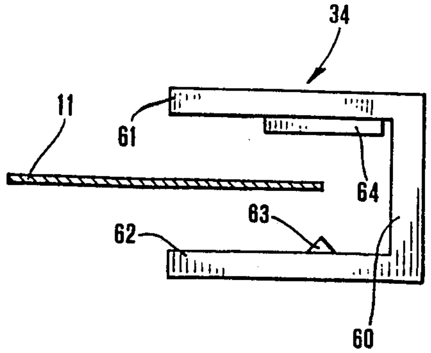
FIG. 3 shows, in a larger scale, a second detail of FIG. 1.

As shown in FIG. 3, detector device 34 also comprises a U shaped support element 60, between whose arms 61 and 62 slides the web 11. Mounted on the arm 62, in the region of the righthand edge (looking at FIGS. 1 and 3) of the web 11, there is a photoemission element constituted by a device 63 that emits infrared rays, towards which are pointed photosensitive means 64 mounted on the arm 61.

Similarly to what has been stated in respect of the detector device 33, the said photosensitive means 64 can be constituted by image scanning sensors belonging to a CCD array circuit of a known type.

Figure 4:
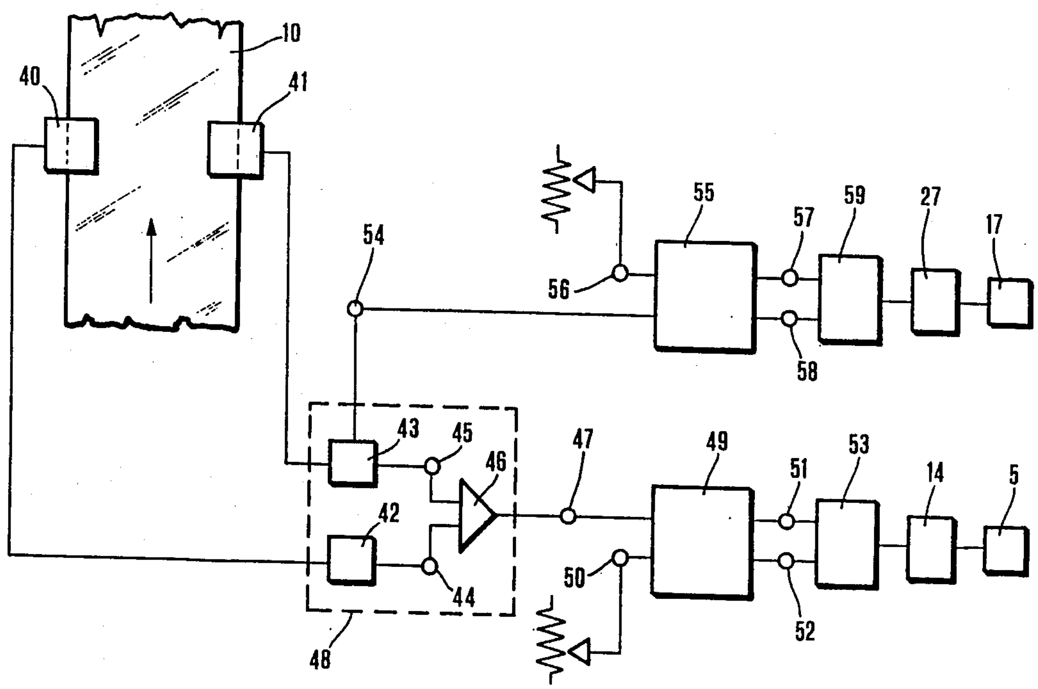
FIGS. 4 and 5 show, in block diagram form, two electric circuits for the operation of the device according to the invention.
Figure 5:
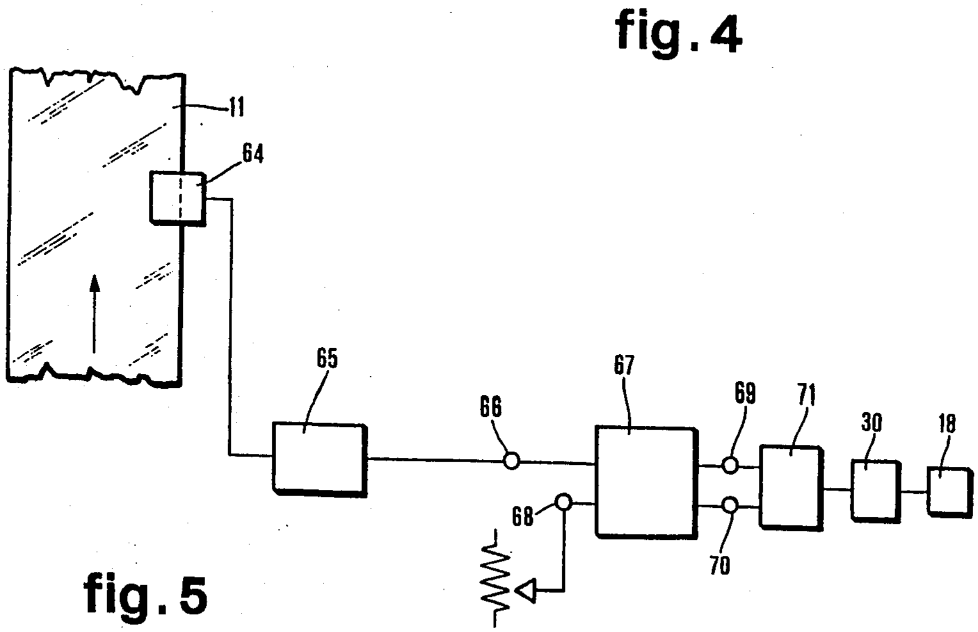

As shown in the block diagram in FIG. 5, the photosensitive means 64 is connected, at the output thereof, to a circuit block 65 similar to the blocks 42 and 43 shown in FIG. 4. The block 65 to which is given the task of checking the crosswise position of the web 11, emits, to a first input terminal 66, a signal indicative of the position of the righthand edge of the web 11 with respect to the photosensitive means 64.

The first input terminal 66 is connected to a logic type comparison block 67, identical to the block 55 and provided with a second input terminal 68, at which arrives a predetermined signal indicative of the correct position of the righthand edge of the web 11 and, consequently, of the correct position of the web 11 itself.

The block 67 is provided with two outputs connected to a first and to a second output terminal 69 and 70, respectively, leading to a block 71 of a known type for operating the dual roatation direction step-by-step motor 30 in respect of the deviation device 18 placed downstream of the cutter device 7.

Consideration will now be given to the device according to the invention under the operating conditions of the cigarette making machine 1.

When the web 10 is centered perfectly with respect to the cutter device 7, the two webs 10 and 11 are identical in width and two voltage signals that are identical one with the other are present at the terminals 47 and 50.

Under said conditions, a zero logic signal is present on both the terminals 51 and 52 and, consequently, the block 53 receives no operating signal. Thus the motor 14 of the deviation device 5 is maintained in a state of inactivity.

In the event of the web 2 moving towards the right (when looking at FIG. 1) with respect to the ideal position, a decrease occurs in the width of the web 10 and there is, in consequence, an increase in the width of the web 11.

As the web 10 narrows, the degree of illuminance of at least one of the photosensitive means 40 or 41 is intensified and, in the case of the example in question, the overall number of illuminated sensors increases. As a result of this shift, the voltage present at the input terminal 47 of the block 49 increases.

Once the voltage exceeds, by a given value, the threshold voltage present at the second input terminal 50 of the comparison block 49, the signal on the output terminal 51 passes from zero logic state value to logic state value 1 whereby, through the block 53, the motor 14 is set in operation.

In the case under consideration, the deviation device 5 displaces under the control of the motor 14, the web 2 towards the left (when looking at FIG. 1) in such a way as to cause the web 2 to resume the correct position with respect to the cutter device 7.

Once the situation is established, the voltage on the terminal 47 equals that on the terminal 50, the signal present on the terminal 51 is returned to a zero logic level and the motor 14 ceases operating.

What has been stated so far in respect of the web 2 moving towards the right (when looking at FIG. 1) can be repeated in the case of a displacement towards the left, that is to say, an increase in the width of the web 10 with a consequent decrease in the width of the web 11.

Naturally in this second case there will be, in the photosensitive means 40 and 41, a decrease in the overall number of sensors illuminated and, therefore, a diminished voltage present at the input terminal 47 of the block 49.

The moment when the difference between the voltage present on the terminal 47 and the threshold voltage present on the terminal 50 exceeds a given value, the signal on the terminal 52 passes from the zero logic state value to logic state value 1 whereby, through the block 53, the motor 14 is set in operation in the reverse direction to that in respect of the first case seen.

Again under the operating conditions of the cigarette making machine 1, consideration will now be given to the behavior of the device according to the invention as regards checking the crosswise position of the web 10.

Assuming the web 10 to be centered correctly with respect to the guide 22, the two signals present at the input terminals 54 and 56 of the comparison block 55 are identical one with the other, and the signals on the two output terminals 57 and 58 are maintained at a zero logic level.

Under said conditions, the motor 27 in respect of the deviation device 17 remains in a state of inactivity.

Should, following a displacement of the web 10 towards the right or towards the left, a variation occur in the condition of illuminance of the photosensitive means 41, the signal at the terminal 54 undergoes a variation, and at one of the two output terminals 57 or 58 a logic level 1 signal is present that causes the motor 27 to operate in the direction of rotation whereby said displacement is returned to a zero value.

As soon as the deviation device 17 has re-established the correct position of the web 10, to the comparison block 55 are given, at the input terminals 54 and 56 thereof, two identical signals that consequently cancel the operating signal of the motor 27.

The checking of the crosswise position of the web 11 takes place, as stated previously, under the action of the circuit shown in FIG. 5 in the same way as described with reference to the web 10.

It is obvious from the preceding description that the device according to the invention attends constantly to checking the width and the position of the two webs 10 and 11, correcting any deviation with respect to the correct crosswise dimension of the two webs, and any displacement of the webs 10 and 11 with respect to the precise centering position thereof on the guides 22 and 23.

Figure 6:
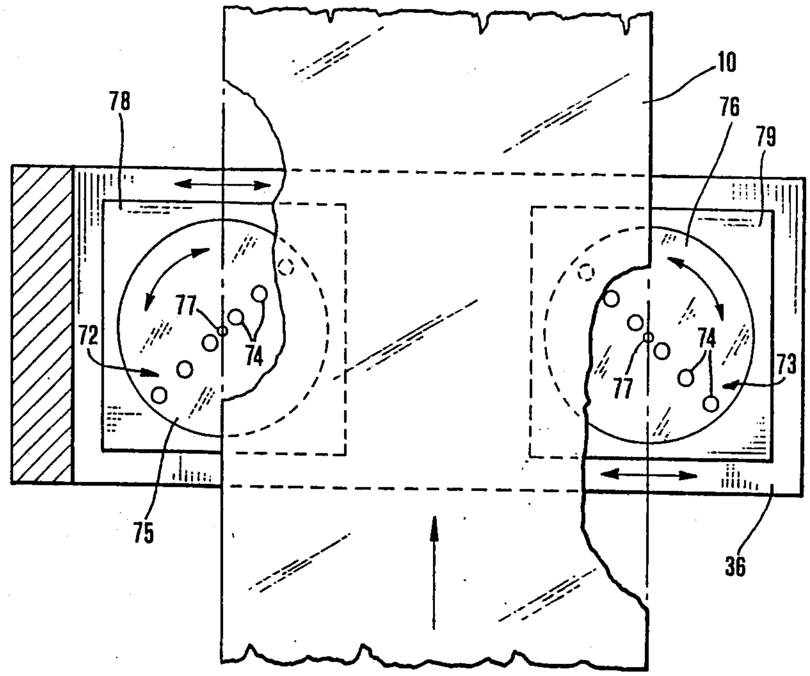
FIGS. 6 and 7 show two different embodiments for the detail depicted in FIG. 2.
Figure 7:
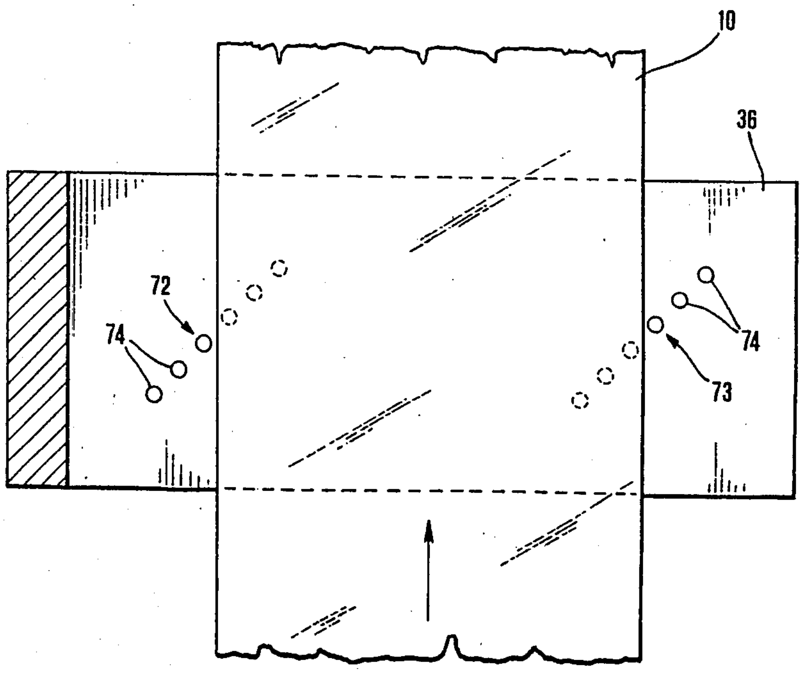

In FIGS. 6 and 7, there are shown two different embodiments for the detector device 33, in which the photosensitive means are constituted by first and second sets 72 and 73, respectively, of phototransistors 74 (for example, of the type known as the SIEMENS SFH305) which, in FIG. 6, are arranged in a rectilinear fashion and converge in the direction in which the web 10 moves forward. In FIG. 7, they are arranged parallel to one another.

In FIG. 6, the first and second sets 72 and 73, respectively, of phototransistors 74 are supported by corresponding disks 75 and 76 mounted, through the medium of the pins 77, in a way whereby they are able to rotate on corresponding plates 78 and 79 so fitted to the arm 36 as to be able to slide transversely with respect to the forward movement direction of the web 10.

The device shown in FIG. 6 can, in consequence of the foregoing, be set to check webs of different crosswise dimensions by adjusting suitably the distance the plates 78 and 79 are apart.

Furthermore, the possibility of varying the angular position of the sets 72 and 73 of phototransistors 74 through a rotation around the pins 77 of the disks 75 and 76 enables the sensitivity of the complete detector device 33 to be regulated.

Looking at FIG. 6 it can be seen, in fact, that with a rotation counterclockwise and clockwise, respectively, of the two disks 75 and 76, a decrease takes place in the pitch, measured transversely to the direction in which the web 10 moves forward, of the phototransistors 74, and that a lesser deviation in the edges of the web 10 can be noticed by the detector device 33.

What is claimed is:

1. A device for supplying webs of wrapping material to a cigarette making machine of the two rod type, comprising:
   - a cutter means for separating longitudinally a web of wrapping material, defined as the main web, into a first web and a second web;
   - means for guiding the main web to the cutter means;
   - means for guiding the first and the second web to a utilization area;
   - a first deviation device associated with said main web for detecting the displacement thereof in a direction crosswise to that in which said main web moves forward;
   - two additional deviation devices, one of which is associated with said first web and the other of which is associated with said second web, for detecting the respective displacement thereof in a direction crosswise to the directions in which the first and second webs move forward;
   - motor means for driving the first deviation device and the two additional deviation devices; and
   - detector means for checking and correcting the width and the position of the first web and the second web;

said detector means being associated with said first web and said second web for checking, upstream of the utilization area, the width of at least one of the first web and the second web and the position of their edges;

said detector means including circuit means interlocked thereto for operating, in response to output signals of the detector means, the motor means with respect to each of said deviation devices until corrections of the widths and the positions of the first web and the second web are effected.

2. The device according to claim 1, wherein the detector means associated with said first web is placed, with respect to this first web, in such a way as to emit signals indicative of the position of both edges of said first web, in order to operate, through part of the circuit means, the motor means of the deviation devices associated with said main web and said first web, respectively, and wherein the detector means associated with said second web is placed, with respect to this second web, in such a way as to emit signals indicative of the position of one of the edges thereof, in order to operate, through part of the circuit means, the motor means of the deviation device connected to the second web.

3. The device according to claim 1, wherein the circuit means interlocked to the detector means associated with said first web comprise:

a circuit block for emitting a first signal indicative of the width of the first web and a second signal indicative of the crosswise position of the first web;

a circuit block for making a comparison between said first signal and a signal indicative of the correct width of the first web, and also for emitting a signal for operating the motor means of the deviation device connected to the main web; and a circuit block for making a comparison between said second signal and a signal indicative of the correct crosswise position of the first web, and also for emitting a signal for operating the motor means of the deviation device associated with the first web; and wherein the circuit means interlocked to the detector device associated with said second web comprise:

a circuit block for emitting a signal indicative of the crosswise position of the second web; and a circuit block for making a comparison between this signal indicative of the crosswise position of the second web and a signal indicative of the correct crosswise position of the second web, and also for emitting a signal for operating the motor means of the deviation device associated with the second web.

4. The device according to claim 2, wherein said detector means comprise photosensitive means constituted by image scanning sensors belonging to CCD array circuits.

5. The device according to claim 2, wherein said detector means comprise photosensitive means constituted by two sets of phototransistors.

6. The device according to claim 5, wherein said two sets of phototransistors are adjustable crosswise with respect to the direction in which said webs move forward.

7. The device according to claim 6, wherein said two sets of phototransistors are arranged in a rectilinear fashion so that each of the two sets is adjustable in a plane parallel to the plane in which lies the corresponding web, in the region of the detector means.

* * * * *